United States Patent [19]

Mueller et al.

[11] Patent Number: 5,341,901

[45] Date of Patent: Aug. 30, 1994

[54] FLUTED INSERT FOR LUBRICATION SYSTEMS IN POWER TRANSMISSION DEVICES

[75] Inventors: Wayne E. Mueller, Milford; Wayne R. Coffey, Howell, both of Mich.

[73] Assignee: New Venture Gear, Inc., Troy, Mich.

[21] Appl. No.: 33,115

[22] Filed: Mar. 18, 1993

[51] Int. Cl.$^5$ ............................................. F01M 9/00
[52] U.S. Cl. .................................. 184/6.12; 184/27.1; 74/467
[58] Field of Search ............... 184/6.12, 12, 26, 27.1, 184/61; 74/467 X

[56] References Cited

U.S. PATENT DOCUMENTS

| | | | |
|---|---|---|---|
| 863,153 | 8/1907 | Coffman | 184/61 |
| 2,486,477 | 11/1949 | Kennedy | 184/6.12 |
| 4,040,309 | 8/1977 | Wood et al. | 184/6.12 |
| 4,222,283 | 9/1980 | Nagy. | |
| 4,987,974 | 1/1991 | Crouch | 184/6.12 |
| 5,085,303 | 2/1992 | Frost. | |

FOREIGN PATENT DOCUMENTS

| | | | |
|---|---|---|---|
| 0140669 | 6/1986 | Japan | 74/467 |
| 0046097 | 2/1987 | Japan | 184/6.12 |
| 0179141 | 11/1966 | U.S.S.R. | 184/61 |

Primary Examiner—Thomas E. Denion
Attorney, Agent, or Firm—Harness, Dickey & Pierce

[57] ABSTRACT

The present invention is directed to an improved lubrication system for power transfer devices which increases the flow of lubrication along an axial bore formed within a rotating shaft. In the present invention, a rotor is disposed within the bore of a rotating shaft and secured to rotate with the shaft. The rotor acts to draw substantially more lubrication along the bore than would be drawn due to the centrifugal effect alone.

2 Claims, 2 Drawing Sheets

| ANGLE (DEGREES) | W/O ROTOR 4TH BEARING | 3RD BEARING | WITH ROTOR 4TH BEARING | 3RD BEARING |
|---|---|---|---|---|
| 1.0 | HEAVY | LIGHT | HEAVY | HEAVY |
| 2.2 | 80-90% OF 1 DEGREE | LIGHT | HEAVY | HEAVY |
| 3.4 | 75% OF 1 DEGREE | NONE | HEAVY | HEAVY |
| 4.5 | 50% OF 1 DEGREE | NONE | 80% OF 1 DEGREE | LIGHT |
| 6.1 | NONE | NONE | 50% OF 1 DEGREE | TRACE |
| 8.8 | NONE | NONE | TRACE | NONE |

Fig-2

FLUTED INSERT FOR LUBRICATION SYSTEMS IN POWER TRANSMISSION DEVICES

BACKGROUND AND SUMMARY OF THE INVENTION

The present invention relates generally to lubrication systems for power transmission devices, and more particularly, to an improved centrifugal shaft lubrication system for power transmission devices As is known, motor vehicles are equipped with power transfer devices, such as manual and automatic transmissions or four-wheel drive transfer cases, for transmitting driving torque from a power source to the ground engaging wheels. Conventional power transfer devices include a number of drive elements (i.e., clutches, drive gears, bearings and the like) that are journally supported upon shafts for relative rotation with respect thereto. While such drive elements are typically illustrated in part prints to be in metal-to-metal contact with the shaft, they are actually supported upon on a thin film of lubrication. If the drive elements were actually in metal-to-metal contact with the shaft, they would quickly generated heat and, in some instances, become welded or seized to the shafts. In other cases, excessive amounts of wear can occur resulting in the premature failure of the power transfer device. Thus, in order to increase the reliability and service life of these devices, it is important to provided ample amounts of lubrication to these areas such that the lubrication film is maintained between the drive elements and the power transfer shaft.

In this regard, it is well known that oil or other viscous lubrication can be communicated to the drive elements via radial passages connecting to an axial bore formed within the rotating shaft. Such an arrangement for lubricating elements of a manual transmission is disclosed and discussed in U.S. Pat. No. 4,222,283. Thus, lubrication can be delivered to the drive elements within a power transfer device by first forming an axial bore within the shaft and then forming radial passage which communicate with the axial bore such that lubrication within the axial bore is delivered to the circumference of the shaft where the drive elements are supported.

When several drive elements are support along the shaft the axial bore must be extended and a number of radial passages are required to supply lubrication to each of the drive elements. Unfortunately, there is a tendency for an uneven discharge of lubrication through these radial passages as the lubricant flows along the axial bore. As a result, a lubrication "starvation" condition may be generated which can reduce the durability and reliability of the drive elements. Also, when the shaft is angled with respect to the earth, gravity tends to counteract the flow causing a further reduction in the amount of lubrication which is drawn along the axial bore. Such conditions may occur due to the design of the power transfer device or where a vehicle in which the power transfer device is incorporated operates at an angle, such as when driving up or along a hill.

Accordingly, the present invention is directed to an improved lubrication system for power transfer devices which greatly improves the flow of lubrication along an axial bore formed within a rotating shaft. In the present invention, a rotor is disposed within the bore of a rotating shaft and secured to rotate with the shaft. The rotor acts to draw substantially more lubrication along the bore than would normally flow thereby improving the supply of lubrication to the drive elements disposed along a rotating power transmission shaft.

Another advantage of the present invention is that the improved lubrication system counteracts the above-noted gravitational effects such that the flow and distribution of lubrication flow along the axial bore of a rotating shaft disposed at an angle with respect to the earth is greatly enhanced.

Yet another advantage of the present invention is to provide a lubrication system which is inexpensive and adaptable to any power transfer device incorporating a centrifugal lubrication system.

BRIEF DESCRIPTION OF THE DRAWINGS

Further objects, features and advantages of the present invention will be apparent from the following description and accompanying drawings in which:

FIG. 2 is a table of experimental results from tests performed on transmission members incorporating the present invention.

DETAILED DESCRIPTION OF THE INVENTION

Figure 1:
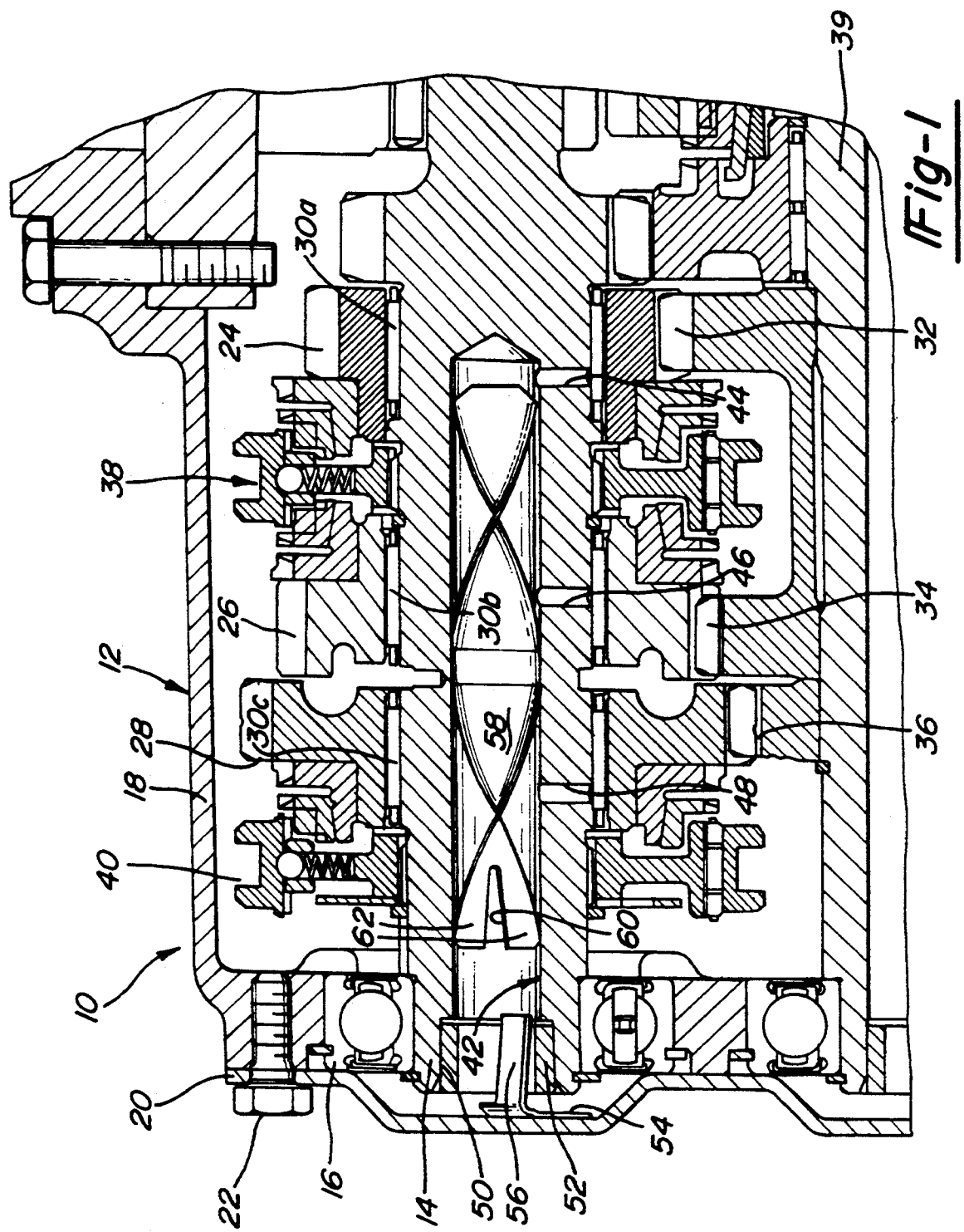
FIG. 1 is a partial sectional view of an exemplary power transfer device incorporating the improved centrifugal lubrication system of the present invention therein.

The present invention provides an improved centrifugal lubrication system for power transfer devices. While shown embodied in a lubrication system adapted to the input shaft of a manual transmissions, those skilled in the art will appreciate that the invention is not so limited in scope and is readily adaptable for use with any mechanical device incorporating a centrifugal lubrication system.

Referring to FIG. 1, a portion of a five-speed manual transmission 10 is shown having a housing 12 and a input shaft 14 rotatably supported within housing 12 by bearings 16. Housing 12 includes a first housing member 18 and an end cover 20 secured to housing member 18 by a plurality of threaded fasteners one of which is shown at 22. Input shaft 14 is adapted to receive driving input torque from a suitable power source (i.e., an internal combustion engine) in a well-known manner.

Shown in FIG. 1 are 3rd, 4th and 5th speed gear sets 24, 26, and 28, respectively, of manual transmission 10. It should be understood that additional speed gears and reverse gear arrangements are possible without varying from the scope of the present invention. Reference may also be had to commonly assigned U.S. Pat. No. 4,677,868 which discloses a suitable manual transmission for use with the present invention, the disclosure of which is hereby expressly incorporated herein by reference. As can be seen in FIG. 1, gear sets 24, 26 and 28 are rotatably supported on input shaft 14 by needle roller bearings 30a, 30b and 30c, respectively. In addition, each of the speed gear sets 24, 26 and 28 are adapted to engage mating gears 32, 34 and 36, respectively, splined to a transmission countershaft, partially shown at 39, for providing driving output.

Disposed adjacent 3rd and 4th gear sets 24 and 26, is a dual action synchronizer assembly 38. Dual action synchronizer 38 is shown as a strut-type synchronizer, a complete description of the structure and function of which may be had by referring to commonly assigned U.S. Pat. No. 5,085,303 the disclosure of which is hereby expressly incorporated herein by reference. Similarly, disposed adjacent 5th speed gear set 28 is single-action synchronizer 40. Synchronizers 38 and 40 function in a known manner for selectively coupling input shaft 14 to speed gears 24, 26 and 28 under action of a suitable shift mechanism (not shown).

Input shaft 14 has a blind bore 42 formed along its longitudinal axis. Gear sets 24, 26 and 28 are disposed along shaft 14 and about bore 42. A series of radial passages or bores 44, 46 and 48, are formed from the outer circumference of input shaft 14 to communicate with axial bore 42. Moreover, radial bores 44, 46, and 48 are substantially aligned with needle bearings 30a, 30b and 30c, respectively, and therefore, are substantially aligned with speed gear sets 24, 26 and 28, respectively. As is known, when input shaft 14 is rotated, lubricant entering the end 50 of axial bore 42 will be communicated along the length of bore 42. Lubricant encountering radial bores 44, 46 and 48 will be further communicated to needle bearings 30a, 30b and 30c, respectively. End 50 of bore 42 is enlarged to receive a sleeve 52. Also, shield 54 is fixed to housing 12 and has a tab 56 extending into bore 42. Shield 54 acts to direct lubricant flowing within housing 12 into bore 42. Once directed into bore 42, shield 54 helps to retain the lubricant with bore 42 until it can be carried by centrifugal force along its length.

In accordance with the preferred embodiment of the present invention, a rotor 58 is disposed within axial bore 42. In the embodiment shown, rotor 58 is a single 360° helix formed from a flat piece of sheet metal stock. However, it should be understood that rotor 58 could also be formed from plastic or other suitable material. Rotor 58 is approximately the same width as axial bore 42 and extends along a substantial length portion thereof as well. Formed at one end of rotor 58 is cut-out 60 defining two tabs 62. In the preferred embodiment, tabs 62 are plastically deformed radially outwardly thereby locally increasing the effective width of rotor 58. When inserted into bore 42, tabs 62 enter into an interference engagement with the inner surface of bore 42, thereby retaining rotor 58 within bore 42 for simultaneous rotation therewith. In operation, rotor 58 rotates with shaft 14. Lubrication entering bore 42 is communicated along rotor 58 such that the overall flow of lubrication within bore 42 is increased, whereby lubrication delivered to the drive elements located furthest away from end 50 of bore 42 is greatly improved. As will be appreciated, the length of rotor 58 and its number of helical turns can be varied to provide the requisite lubrication needs for any particular centrifugal lubrication application.

As described for conventional centrifugal lubrication systems not incorporating the rotor of the present invention, and particularly when shaft 14 is angled with respect to the earth, the flow of lubricant along bore 42 may be insufficient to adequately lubricate all drive elements disposed along shaft 14. That is, in some instances lubricant may not be communicated to all of the radial bores and thus deprive (i.e., "starve") the bearings supporting the drive elements of lubrication. On the left side of the table shown in FIG. 2 are the results of tests performed on an otherwise conventional lubrication system not incorporating the rotor of the present invention. The test conditions are: input shaft velocity of approximately 2400 RPM, axial bore diameter of approximately 15 mm, and the indicated angles of the shaft. For angles as small as 1.0 degree, lubricant flow to the third radial passage, corresponding to passage 44 in FIG. 1, was light and at angles above 3.4 degrees, there was no lubricant flow.

The results indicated on the right hand side of the table are from tests conducted on the same lubrication system adapted with the rotor of the present invention. Under the same testing conditions lubrication flow along axial bore 42 was significantly increased. As can be seen from the table, there was heavy flow from the third radial passage 44 at angles up to 3.4 degrees and still a trace flow of lubrication at angles up to 6.1 degrees.

A specific embodiment of the invention has been shown and described in detail to illustrate the principles of the present invention. It will be understood that the invention may be embodied in other forms without departing from such principles and the fair scope of the present invention.

What is claimed is:

1. A lubrication system for a power transfer device having a housing, a shaft rotatably disposed within said housing, a number of drive elements supported on said shaft for relative rotation with respect thereto, an axial bore formed in the shaft, and radial passages formed in said shaft adjacent to the drive elements and in fluid communication with the axial bore, the improvement comprising a rotor comprising a flat piece of material having first and second ends and a width approximately that of the axial bore, the first and second ends being formed into helices disposed within the axial bore and secured for rotation with the shaft for drawing lubrication along said axial bore, whereby an increased amount of said lubrication is discharged through the radial passages.

2. The lubrication system of claim 1 wherein said rotor further comprises a slot formed in one of said first and second ends whereby said width of said helical rotor is locally widened by deforming said rotor adjacent said slot such that said deformation acts to interferingly engage said axial bore to retain and fix said rotor to said bore for rotation with said shaft.

* * * * *